Figure 2:
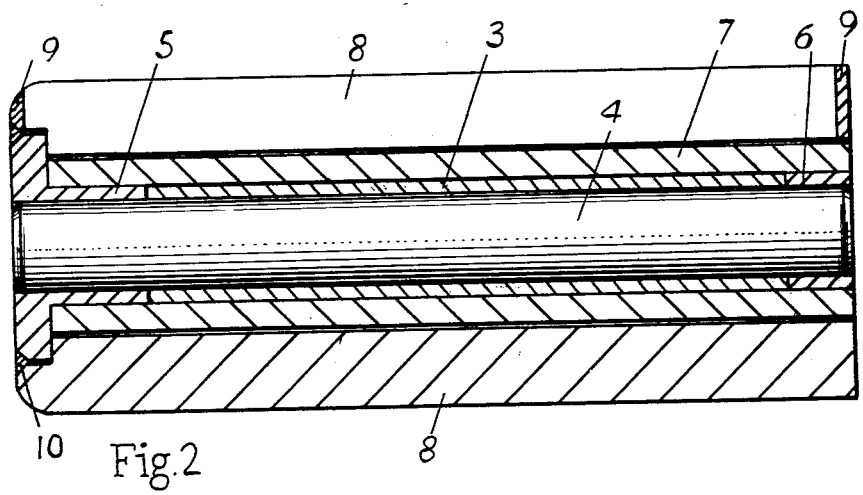

May 5, 1964   J. C. GUEST ETAL   3,131,804
METHOD OF DRAWING OR EXTRUDING ELONGATED METALLIC WORKPIECES
Filed Jan. 25, 1962

United States Patent Office 3,131,804
Patented May 5, 1964

3,131,804
METHOD OF DRAWING OR EXTRUDING ELONGATED METALLIC WORKPIECES
Joseph Clifford Guest, Birmingham, and William Arthur Sallis, Hepthorne Lane, near Chesterfield, England, assignors to T. I. (Group Services) Limited, Birmingham, England
Filed Jan. 25, 1962, Ser. No. 168,723
Claims priority, application Great Britain Feb. 27, 1961
3 Claims. (Cl. 205—8)

This invention relates to a method of extruding or drawing tubes, bars or other elongated metallic workpieces, the method being of the kind including the steps of placing the workpiece in an extensible metallic envelope, heating the workpiece and envelope to a temperature dependent on the material from which the workpiece is made, extruding or drawing the combined workpiece and envelope, and subsequently removing the envelope.

The object of this invention is to provide such a method in an improved form whereby the time taken to remove the envelope is reduced.

According to the invention, in a method of the kind specified, the envelope is formed at least in part from a plurality of longitudinally divided parts which are welded or otherwise secured together in a manner so as to be readily separable after the drawing or extruding operation.

The envelope preferably comprises a hollow liner closely surrounding the workpiece and itself surrounded by the longitudinally divided parts. Where, however, the workpiece is solid, or is hollow and a core is employed, the liner may be omitted.

Figure 1:
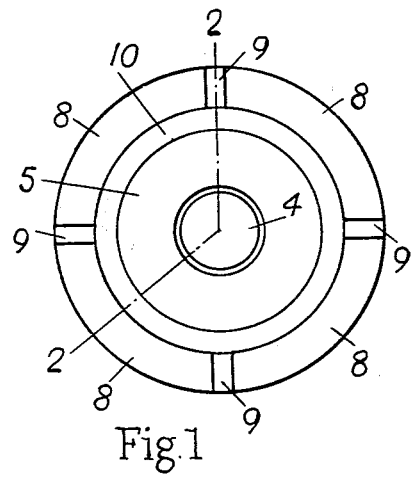

An example of the invention as applied to a hollow workpiece is illustrated in the accompanying drawings, in which FIGURE 1 is an end view and FIGURE 2 is a sectional side view on the line 2—2 in FIGURE 1.

Referring to the drawing there is first inserted into the bore of the workpiece 3 a solid core 4 formed from a material which can be extended uniformly, and which where the workpiece to be formed is made from a brittle material such, for example, as beryllium, preferably has a greater coefficient of expansion than the workpiece. The workpiece 3 is located on the core 4 by a pair of end plugs 5, 6, and the combined core 4 and workpiece 3 is inserted within an extensible metallic envelope which comprises an inner hollow liner 7 closely surrounding the workpiece 3 and capable of being dissolved by an acid which will not attack the workpiece. The liner is itself closely surrounded by a plurality of longitudinally divided parts 8, which are lightly secured together as by welding 9 at their ends and along the longitudinal dividing lines, and are also lightly welded as shown at 10 to the plug 5. The whole assembly is then extruded or drawn in known manner. Preferably a coating of lime is applied to the longitudinally divided parts 8 in order to prevent them from becoming welded together or to the liner during the extrusion or drawing operation. In order to promote even spreading of the lime, where the parts 8 are formed from steel they may be oxidized, or alternatively a coating of an oxalate may be applied to their surfaces, before coating them with lime.

In some cases however, the oxidation may render the lime unnecessary.

After the extrusion or drawing operation, the assembly is machined or lightly pickled to remove the welding 9, 10, whereafter the longitudinally divided parts 8 can readily be removed. Finally the liner 7 is removed by pickling and the core 4 is removed by stretching, although in some instances where the core 4 is formed from a material having a higher coefficient of expansion than that of the workpiece 3 the stretching operation may be unnecessary.

In a modification of this example, an economic advantage may be obtained in certain instances by employing a core including a tubular part having a greater coefficient of expansion than the workpiece, and a solid part formed from some convenient cheaper material.

In a further example the extrusion or drawing operation is carried out by imparting relative movement to the assembly and a fixed mandrel. In this case a tubular core is necessarily employed and is preferably chosen to have a thickness such that it will be dissolved in approximately the same time as the hollow liner. It will be understood that in this example it is not necessary for the core to be capable of being stretched uniformly, although where the coefficient of expansion of the core is greater than that of the workpiece it may be possible to remove the core without pickling.

Although an example of the invention has been described as applied to a hollow workpiece, it will be appreciated that it may be applied to any elongated hollow or solid workpiece of round or other cross-section.

Having thus described our invention what we claim as new and desire to secure by Letters Patent is:

1. A method of shaping and elongating a workpiece in the form of a rod, comprising surrounding the workpiece with a hollow liner which is capable of being dissolved in an acid which will not attack the workpiece, surrounding the liner with an extensible metallic envelope comprising a plurality of longitudinally divided parts lightly secured together so as to be readily separable, heating the assembly formed by the workpiece, liner and envelope, forcing the heated assembly through a die, removing the envelope, and dissolving the liner in an acid which does not attack the workpiece.

2. A method of shaping and elongating a workpiece in the form of a tube, comprising placing an extensible core within the tube, surrounding the core and tube with a hollow liner which is capable of being dissolved in an acid which will not attack the workpiece, surrounding the liner with an extensible metallic envelope comprising a plurality of longitudinally divided parts lightly secured together so as to be readily separable, heating the assembly formed by the workpiece, core, liner and envelope, forcing the heated assembly through a die, removing the envelope, removing the core, and dissolving the liner in an acid which does not attack the workpiece.

3. A method of shaping and elongating a tube of circular cross-section, comprising placing the tube over an extensible core so that the core extends beyond the core at both ends thereof, placing a pair of end plugs over the ends of the core so that the plugs form continuations of the tube, surrounding the tube and plugs with a hollow liner which is capable of being dissolved in an acid which will not attack the tube, surrounding the liner with an extensible metallic envelope comprising a plurality of longitudinally divided parts lightly secured together so as to be readily separable, heating the assembly formed by the tube, core, plugs, liner and envelope, forcing the heated assembly through a die, removing the envelope, dissolving the liner in an acid which does not attack the tube, removing the end plugs, and removing the core by stretching it.

References Cited in the file of this patent

UNITED STATES PATENTS

| | | |
|---|---|---|
| 117,494 | Wheeler | July 25, 1871 |
| 1,568,369 | Everett | Jan. 5, 1926 |
| 2,021,945 | Payne | Nov. 26, 1935 |
| 2,050,298 | Everett | Aug. 11, 1936 |
| 2,985,945 | Nordheim et al. | May 30, 1961 |

FOREIGN PATENTS

| | | |
|---|---|---|
| 189,031 | Austria | Feb. 25, 1959 |